(12) United States Patent
Drury et al.

(10) Patent No.: US 12,182,587 B2
(45) Date of Patent: Dec. 31, 2024

(54) REMOTE SERVER MANAGEMENT UTILIZING SELF CONTAINED BASEBOARD MANAGEMENT CONTROLLER

(71) Applicant: SOFTIRON LIMITED, Chilworth (GB)

(72) Inventors: Robert Drury, Louth (GB); Andrew McNeil, Ipswich (GB); Harry Richardson, Lamarsh (GB); Stephen Hardwick, Austin, TX (US)

(73) Assignee: SOFTIRON LIMITED, London (GB)

( * ) Notice: Subject to any disclaimer, the term of this patent is extended or adjusted under 35 U.S.C. 154(b) by 501 days.

(21) Appl. No.: 17/683,690

(22) Filed: Mar. 1, 2022

(65) Prior Publication Data
US 2022/0276876 A1    Sep. 1, 2022

Related U.S. Application Data

(60) Provisional application No. 63/155,184, filed on Mar. 1, 2021.

(51) Int. Cl.
*G06F 9/4401* (2018.01)
*G06F 1/3206* (2019.01)
(Continued)

(52) U.S. Cl.
CPC .......... *G06F 9/4418* (2013.01); *G06F 1/3206* (2013.01); *G06F 21/56* (2013.01); *G06F 21/572* (2013.01); *G06F 2221/033* (2013.01)

(58) Field of Classification Search
CPC ...... G06F 9/4418; G06F 1/3206; G06F 21/56; G06F 21/572; G06F 2221/033
See application file for complete search history.

(56) References Cited

U.S. PATENT DOCUMENTS

2007/0180314 A1    8/2007   Kawashima et al. ........... 714/15
2007/0300293 A1    12/2007  Tsutsui et al. ..................... 726/5
(Continued)

FOREIGN PATENT DOCUMENTS

CN    105915637 A    8/2016    ............. H04L 12/10
CN    112272098 A    1/2021    ............... G06F 1/28
(Continued)

OTHER PUBLICATIONS

International Search Report and Written Opinion, Application No. PCT/EP2022/064351, 11 pages, Sep. 28, 2022.
(Continued)

*Primary Examiner* — Gary Collins
(74) *Attorney, Agent, or Firm* — Slayden Grubert Beard PLLC

(57) ABSTRACT

A system includes servers, each server including a baseboard management controller (BMC) and operating environments including motherboards and processors. One of the BMCs includes circuitry to determine that the other server is in a standby mode. In a standby mode, the operating environment including the motherboard and processor is powered down and the BMC is powered only through a connection between the BMCs. The first BMC determines that additional resources for execution by the system from the other server are to be activated, and send a wake-up signal to the other BMC. The other BMC includes circuitry configured to receive the wake-up signal, wake the operating environment, and provision the operating environment, without power from the operating environment.

28 Claims, 8 Drawing Sheets

(51) Int. Cl.
    *G06F 21/56* (2013.01)
    *G06F 21/57* (2013.01)

(56) References Cited

U.S. PATENT DOCUMENTS

| | | | |
|---|---|---|---|
| 2009/0248827 A1 | 10/2009 | Hazra et al. | 709/207 |
| 2009/0260081 A1 | 10/2009 | Johnson et al. | 726/22 |
| 2013/0212413 A1 | 8/2013 | Berndt et al. | 713/310 |
| 2013/0254588 A1 | 9/2013 | Fujieda | 714/4.11 |
| 2014/0181490 A1 | 6/2014 | Campbell et al. | 713/2 |
| 2015/0304233 A1 | 10/2015 | Krishnamurthy et al. | |
| 2017/0230179 A1 | 8/2017 | Mannan et al. | |
| 2018/0267858 A1 | 9/2018 | Bacha et al. | |
| 2019/0005274 A1 | 1/2019 | Field et al. | |
| 2019/0156039 A1 | 5/2019 | Harsany et al. | |
| 2019/0166032 A1 | 5/2019 | Inbaraj et al. | |
| 2020/0097057 A1 | 3/2020 | Tseng et al. | |
| 2020/0143047 A1 | 5/2020 | Shivanna | |
| 2020/0279043 A1 | 9/2020 | Thornton et al. | |
| 2021/0110037 A1 | 4/2021 | Hunt et al. | |
| 2021/0111887 A1 | 4/2021 | Higley et al. | |
| 2022/0376911 A1 | 11/2022 | Ruffino et al. | |

FOREIGN PATENT DOCUMENTS

| | | | | |
|---|---|---|---|---|
| EP | 2613262 A2 | 7/2013 | | G06F 1/32 |
| EP | 2642388 A1 | 9/2013 | | G06F 11/20 |
| EP | 2645294 A1 | 10/2013 | | G06F 21/57 |
| EP | 3486824 A1 | 5/2019 | | G06F 21/56 |

OTHER PUBLICATIONS

Taylor, Michael A. et al., "Sensor-Based Ransomware Detection," Future Technologies Conference, URL: https://saiconference.com/Downloads/FTC2017/Proceedings/112_Paper_254-Sensor-based_Ransomware_Detection.pdf, pp. 794-801, Nov. 30, 2017.

Hull, Gavin et al., "Ransomware Deployment Methods and Analysis: Views from a Predictive Model and Human Responses," Crime Science, vol. 8, No. 1, 22 pages, Feb. 12, 2019.

International Search Report and Written Opinion, Application No. PCT/EP2022/064122, 12 pages, Aug. 30, 2022.

U.S. Non-Final Office Action, U.S. Appl. No. 17/396,927, 23 pages, Sep. 1, 2022.

International Search Report and Written Opinion, Application No. PCT/EP2021/073538, 11 pages, Dec. 9, 2021.

International Search Report and Written Opinion, Application No. PCT/EP/2021/072206, 12 pages, Nov. 10, 2021.

International Search Report and Written Opinion, Application No. PCT/EP2022/055188, 13 pages, Jun. 22, 2022.

U.S. Final Office Action, U.S. Appl. No. 17/410,290, 28 pages, Jun. 15, 2023.

U.S. Non-Final Office Action, U.S. Appl. No. 17/750,528, 22 pages, Mar. 6, 2024.

U.S. Non-Final Office Action, U.S. Appl. No. 17/751,074, 31 pages, Oct. 20, 2022.

U.S. Non-Final Office Action, U.S. Appl. No. 17/410,290, 37 pages, Nov. 14, 2022.

REMOTE SERVER MANAGEMENT UTILIZING SELF CONTAINED BASEBOARD MANAGEMENT CONTROLLER

PRIORITY

This application claims priority to U.S. Provisional Patent Application No. 63/155,184 filed Mar. 1, 2021, the contents of which are hereby incorporated in their entirety.

FIELD OF THE INVENTION

The present disclosure relates to monitoring of operation of electronic devices and, more particularly, to a management server and a self-contained Baseboard Management Controller (BMC).

BACKGROUND

A BMC may include a processor and board that monitors the physical state of a computer, network server, or other hardware device using sensors. The BMC may be accessible through the computer, network server, or other hardware device to which the BMC is attached. The BMC may utilize various interfaces and may be contained in the motherboard or main circuit board of the device to be monitored. The computer, network server, or other hardware device may be the "baseboard" for which the BMC is a management controller.

Sensors of a BMC may measure internal physical variables such as temperature, humidity, power-supply voltage, fan speeds, communications parameters, and operating system (OS) functions. If any of these variables happens to stray outside specified limits, an administrator may be notified. That person can then take corrective action by remote control. The monitored device can be power cycled or rebooted as necessary. In this way, a single administrator can remotely manage numerous servers and other devices simultaneously, saving on the overall operating cost of the network and helping to ensure its reliability.

However, typical computer designs based on PC standards for server and other also clustered servers do not have fine grained control of power and hardware resource activation. Thus, BMCs based upon such designs similarly do not have fine grained control of power and hardware resource activation.

By having fine grained control of hardware configuration and activation through power or shutdown or standby configuration, inventors of embodiments of the present disclosure have discovered systems that enable activation as needed.

DETAILED DESCRIPTION

Figure 1:
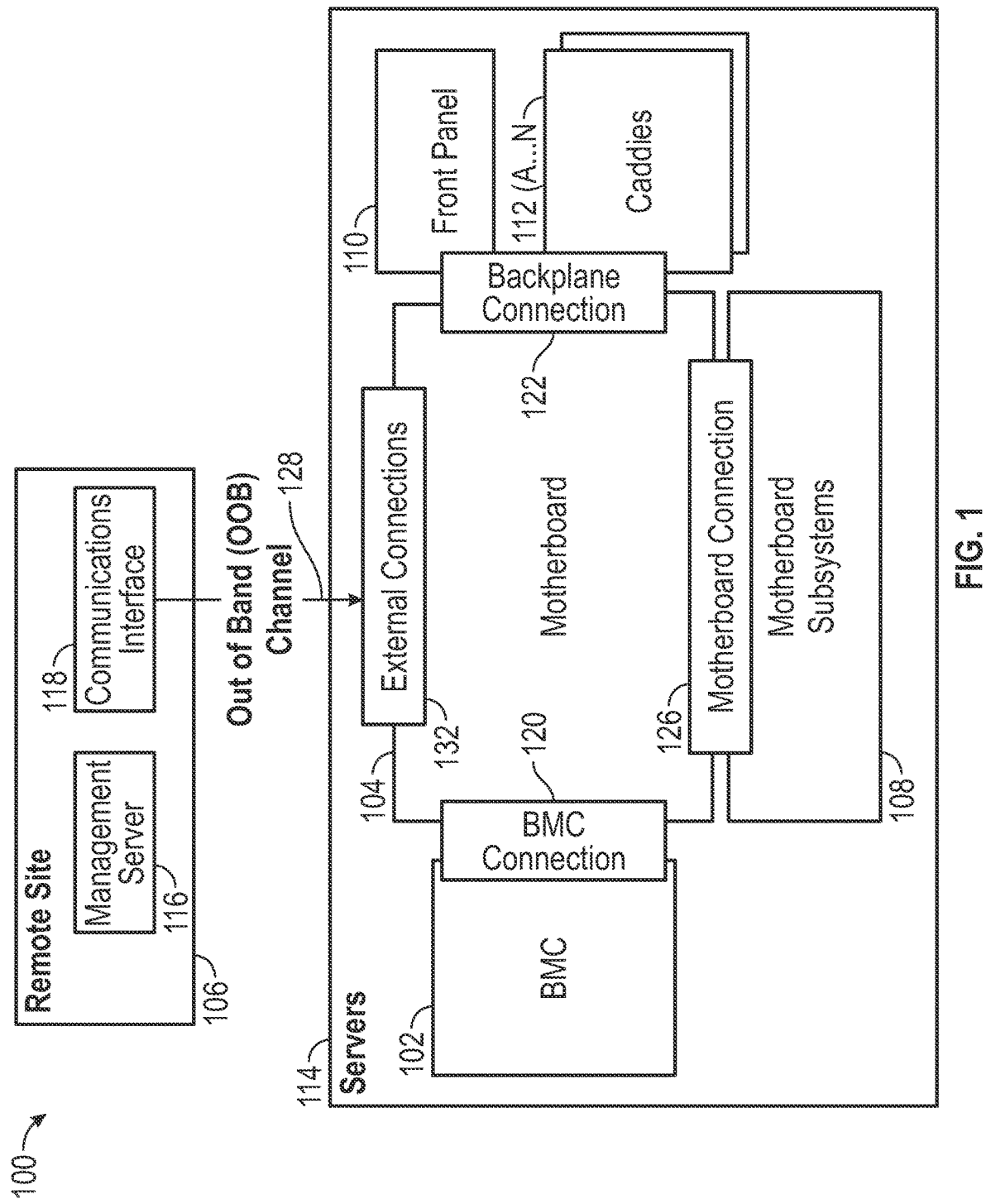
FIG. 1 is an illustration of an example BMC-based system, according to embodiments of the present disclosure.

Embodiments of the present disclosure may include a system. The system may include a first server including a first BMC and a first operating environment. The first BMC may include a first motherboard and a first processor. The system may include a second server including a second BMC and a second operating environment including a second motherboard and a second processor. The first BMC and second BMC may be implemented by analog circuitry, digital circuitry, control logic, instructions for execution by a processor, or any suitable combination thereof. The BMCs may include their own processors, memories, and interfaces to remote servers, each other, and to servers attached or connected thereto. The motherboards may be implemented by analog circuitry, digital circuitry, control logic, instructions for execution by a processor, or any suitable combination thereof. The motherboard by any suitable combination of components. The motherboard may include processors, memories, input output expanders, programmable power control circuitry, and interfaces. The motherboards may be connected to BMCs, subassemblies or subsystems for any suitable auxiliary functions, caddies for storage, or front panels for user interface operations. The first BMC may include circuitry configured to determine that the second server is in a standby mode. In the standby mode, the second operating environment may be powered down. The first BMC may include circuitry configured to determine that the second server is in another inoperable state. The first BMC may include circuitry configured to determine that the second BMC is powered only through a connection between the BMCs. The first BMC may include circuitry configured to determine that additional resources for execution by the system from the second server are to be activated or otherwise booted. The first BMC may include circuitry configured to send a wake-up signal to the second BMC. The second BMC may include circuitry configured to receive the wake-up signal, wake the second operating environment, and provision the second operating environment.

In combination with any of the above embodiments, the system may include a third server including a third BMC and a third operating environment including a third motherboard and a third processor. The first BMC may include circuitry further configured to may include determine that the third server is in a normal mode wherein the third operating environment is powered up, determine that resources for execution by the system from the third server are to be deactivated, and send a signal to the third BMC to deprovision the determined resources to be deactivated.

In combination with any of the above embodiments, the first BMC may include circuitry further configured to wake the second operating environment through a power up sequence specific to the elements of the second operating environment.

In combination with any of the above embodiments, the first BMC may include circuitry further configured to locally store a superset of device drivers for the first or second BMC. The superset of device drivers may include device drivers for hardware not present on the respective first or second BMC. The first BMC may include circuitry further configured to determine newly added hardware in the respective first or second BMC, and update the device drivers on the respective first or second BMC from the locally stored superset of device drivers for the respective first or second BMC to accommodate the newly added hardware.

In combination with any of the above embodiments, the first BMC may be configured to update the second BMC when the second BMC is powered down in an ACPI sleep state of S4 or S5.

In combination with any of the above embodiments, the first BMC may be configured to perform a hardware inventory of the second BMC when the second BMC is powered down in an ACPI sleep state of S4 or S5.

In combination with any of the above embodiments, the first BMC may be configured to retrieve logging data from a memory of the second BMC when the second BMC is in a non-responsive state.

In combination with any of the above embodiments, the first BMC may be configured to perform full remote operational testing and remediation of a server motherboard and associated subassemblies or subsystems of the second server without an operating system of a powered SoC of the second server.

In combination with any of the above embodiments, the first BMC may be configured to preconfigure the second server when the second server is powered down.

In combination with any of the above embodiments, the first BMC may be configured to determine an indication of malware or a security breach on the second server, selectively power down or reconfigure one or more components of the second server based on the determination of malware or the security breach, isolate firmware and UEFI from a system processor of the second server based on the determination of malware or the security breach, and prevent system reboot of the second server after a non-operational state detection based on the determination of malware or the security breach.

In combination with any of the above embodiments, the first BMC may be configured to power up the second BMC upon a determination that the second BMC may safely operate.

In combination with any of the above embodiments, the first BMC may be configured to provide power to the second BMC through a USB or Ethernet interface.

In combination with any of the above embodiments, first BMC may be configured to determine a security attack on the second BMC, reboot the second BMC, and perform a corrective action upon the reboot of the second BMC in response to the security attack.

In combination with any of the above embodiments, the determination that the second server is in standby mode and additional resources from the second server are to be activated may be provided by a remote server to the first BMC.

Embodiments of the present disclosure may include an apparatus. The apparatus may include the first BMC of any of the above embodiments.

Embodiments of the present disclosure may include an article of manufacture. The article may include a non-transitory machine-readable medium. The medium may include instructions. The instructions, when loaded and executed by a processor, may cause the processor to perform the operations or implement the configurations of the first BMC or circuitry thereof of any of the above embodiments.

Embodiments of the present disclosure may include methods performed by any of the systems or BMCs of any of the above embodiments.

FIG. 1 is an illustration of an example BMC-based system 100, according to embodiments of the present disclosure. System 100 may include one or more servers 114 and one or more remote sites 106 that are communicatively coupled. Server 114 may include a BMC 102. BMC 102 may be configured to provide self-contained functions that can be accessed remotely. Server 114 may include a motherboard 104. Motherboard 104 may be configured to contain the main server components and connectors to subassemblies or subsystems. Server 114 may include motherboard subassemblies or subsystems 108, configured to provide localized functions, such as external high-speed communications interfaces. Server 114 may include a front panel 110. Front panel 110 may be configured to interface users with motherboard 104 and BMC 102 through external outputs, including displays, and collect external inputs, including manual entry. Server 114 may include caddies 112, which may include multiple subsystems connected via a backplane connector 122. Using this architecture, various server configurations can be realized. However, each configuration might include a BMC 102 and a motherboard 104.

Server 114 may be communicatively coupled to other instances of server 114 or to any suitable number and kind of remote sites 106. Remote sites 106 may be implemented in any suitable manner, such as by networked servers. Remote site 106 may include a communications interface 118 and a management server 116. Furthermore, remote site 106 may be configured to communicate with BMC 102 via a secure out-of-band (OOB) channel 128. OOB channel 128 may be implemented by, for example, a wireless network, non-production local area network (LAN), universal serial bus (USB) connection, or other suitable network protocol or medium.

Motherboard 104 may be connected to BMC 102 through connector 120. Motherboard 104 may be connected to remote sites through external connections 132. Motherboard 104 may be connected to front panel 110 and caddies 112 through a backplane connector 122. Motherboard 104 may be connected to motherboard subsystems 108 through a motherboard connector 124. Connectors and connections 120, 122, 132, 124 may be implemented in any suitable manner, such as through wired, wireless, or physical connections, digital circuitry, analog circuitry, or any suitable combination thereof, and using any suitable protocol.

BMC 102 may be implemented as a self-contained microcontroller system. BMC 102 may provide a variety of services for the baseboard or larger system or server where it is installed, such as server 114. A baseboard may include a server. Server 114 may include BMC 102, and its own operating environment, caddies of additional hardware, memory, processor, front panel, external connections, and other suitable components. In one embodiment, BMC 102 may be independent of the baseboard configuration of the larger system or server 114. A given instance of BMC 102 may be designed to work with a specific baseboard design. This can either be realized by, for example, a customized design, or a specifically designed software implementation. For example, a given BMC 102 may reference a predefined board inventory set. One challenge for BMC 102 is the component makeup of the operating environment of the baseboard or server 114. In addition to the main processing core, additional hardware modules can be added to server 114. BMC 102 may need to be able to identify these subsystems and adapt its function to manage them. These plug-in modules need not have been explicitly defined at the creation of BMC 102, as new ones can be added to the baseboard or server 114 as they are developed and a later time. BMC 102 may be extensible such that it can accommodate the new modules.

To implement baseboard independence, BMC 102 can load a tree of devices as appropriate. This may be referred to as a device tree in, for example, the operating system Linux. In the advent of any baseboard hardware changes in the operating environment or server 114, this tree can be rebuilt autonomously, in various embodiments. As such, one software installation can be provided with appropriate drivers for manipulating and instrumenting any attached devices. BMC 102 can detect when new devices are added, or devices are removed. This may trigger the compilation of a new device tree. BMC 102 can use the single software installation to align the driver set to match the current device tree. This may include adding new drivers for any new hardware devices that are added to the device tree once it is rebuilt. A single software image for BMC 102 that can access any suitable tree of devices may offer the advantage of simpler manufacturing. This may result in a total life-cycle management of software and hardware that is practical to implement, providing a life-cycle multi-tool for managing software and hardware, according to embodiments of the present disclosure.

BMC 102 may provide standard functions, such as monitoring physical parameters of operation of server 114 against prescribed levels. However, by adding access for BMC 102 to other programmable devices and configurable devices, BMC 102 may have increased capabilities in embodiments of the present disclosure. In addition, BMC 102 can be initialized during manufacturing prior to installation.

BMC 102 may have external connections, such USB and Ethernet, discussed in further detail below. These can be further used in manufacturing, or at installation for maintenance. BMC 102 external connections may be used to communicate with other instances of BMC 102 in other servers in an out-of-band communication.

Embodiments of the present disclosure may include utilization of BMC functions to access servers while the main system on a chip (SoC) is not accessible. Other details of implementations of a BMC may be found, for example, in patent application Ser. No. 17/067,274, the contents of which are hereby incorporated in their entirety.

Figure 2:
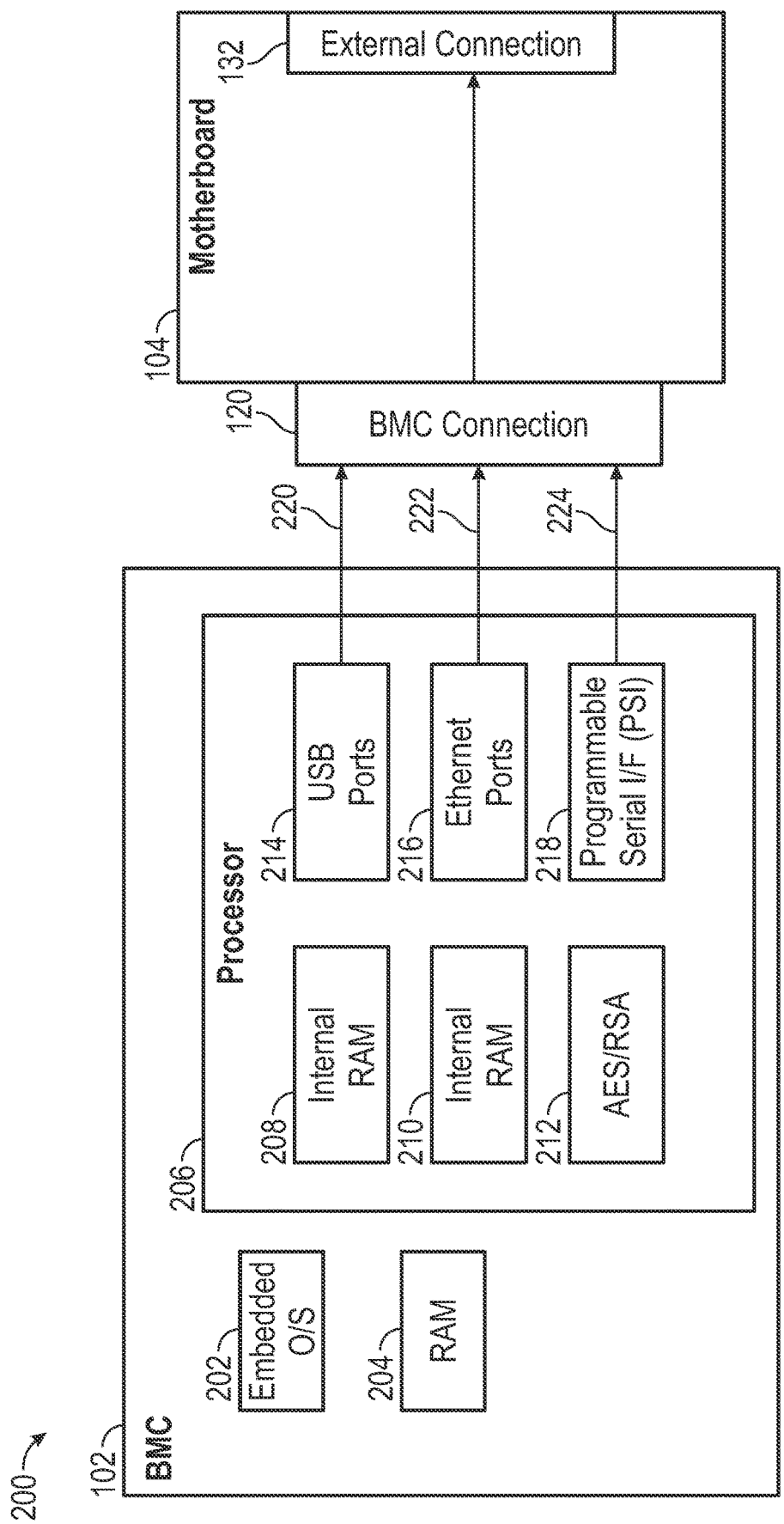
FIG. 2 is a more detailed illustration of the example BMC-based system, including a more detailed view of a BMC, according to embodiments of the present disclosure.

FIG. 2 is a more detailed illustration of the example BMC-based system 100, including a more detailed view of BMC 102, according to embodiments of the present disclosure.

BMC 102 may include a processor 206, embedded operating system 202, and random-access memory (RAM) 204. Processor 206 may in turn contain internal RAM 208, internal ROM 210, Advanced Encryption Standard (AES)/RSA encryption module 212, USB ports 214, Ethernet ports 216, and programmable serial interfaces (PSI) 118. Processor 206 may be implemented as, for example, an SoC. BMC 102 may include connections to motherboard 104, including USB interface 220, Ethernet interface 222, and PSI 224. Such connections may be made through connector 120.

BMC 102, by virtue of processor 206, may have its own operating system. This may be contained partially in internal ROM 210 and in embedded operating system 202. This may allow BMC 102 to operate independently from motherboard 104.

AES/RSA encryption module 212 may provide local cryptographic functions to BMC 102. These functions can be used to create secure communications protocols with remote sites 106.

Figure 3:
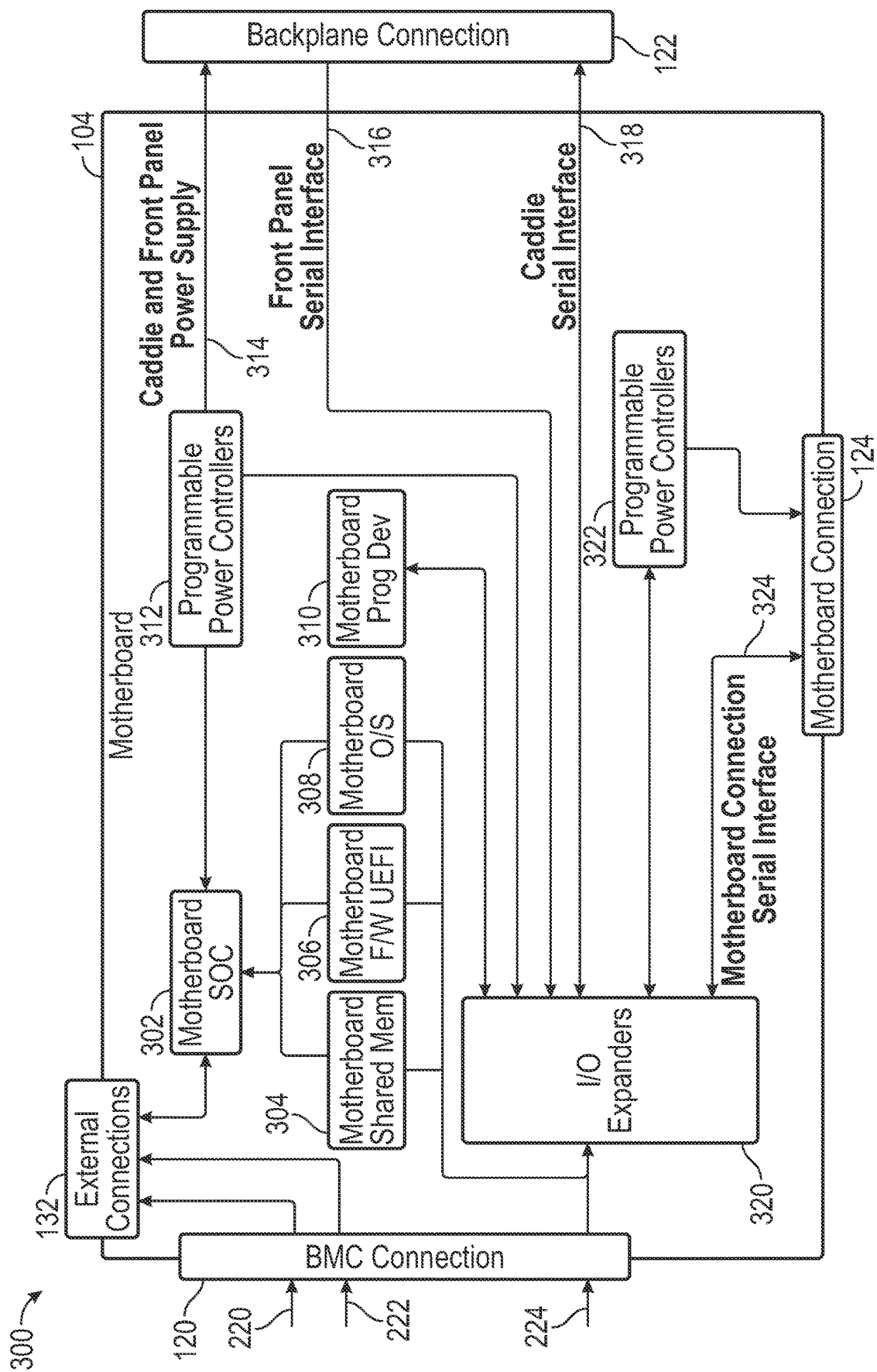
FIG. 3 is a more detailed illustration of the example BMC-based system, including a more detailed view of a motherboard, according to embodiments of the present disclosure.

FIG. 3 is a more detailed illustration of the example BMC-based system 100, including a more detailed view of motherboard 104, according to embodiments of the present disclosure.

Motherboard 104 may contain the core functions required for the server to operate. A motherboard System-On-a-Chip (SoC) 302 may control the normal operations of server 114. SoC 302 may be connected to internal memory resources for firmware (F/W) and Unified Extensible Firmware Interface (UEFI) 306, and for motherboard operating system (O/S) 308. External communications may be provided by external USB and Ethernet connectors of external connections 132. Additional functions may be provided by SoC 302, but are not shown.

Ethernet interface 222 and USB interface 220 from BMC 102 may connect to separate external USB and Ethernet connectors of external connections 132. In addition to providing external communications capabilities to BMC 102, these interfaces can also be used to provide operating power when the main server power is not available from server 114—such as when server 114 is in Advanced Configuration and Power Interface (ACPI) sleep states S4/S5.

PSI 224 may be used to control many devices within the server architecture. On motherboard 104, PSI 224 can directly control motherboard shared memory 304, motherboard firmware and UEFI 306 and motherboard operating system 308. SoC 302 can be physically disconnected from motherboard shared memory 304 and motherboard firmware and UEFI 306 using one of motherboard programmable devices 310. Motherboard programmable devices 310 can include SoC memory isolation and determination of versions of server components. When disconnected, this gives BMC 102 sole control over those memory components.

In motherboard 104, I/O expanders 152 allow PSI 224 to be routed throughout server 114 as follows. A motherboard connector serial interface 324 may extend PSI 224 to motherboard subsystems 108. Serial interface 316 may extend PSI 224 to front panel 110. Caddie serial interface 318 may extend PSI 224 to caddies 112. Programmable power controllers (PPC) 312, 322 may be implemented by digital circuitry, analog circuitry, instructions for execution by a processor, or any suitable combination thereof. PPC 312, 322 may be configured to be controlled to selectively provide power to various components. PPC 312 may provide power to SoC 302, front panel 110, and caddie 112. PPC 322 may provide power to motherboard subsystems 108.

Figure 4:
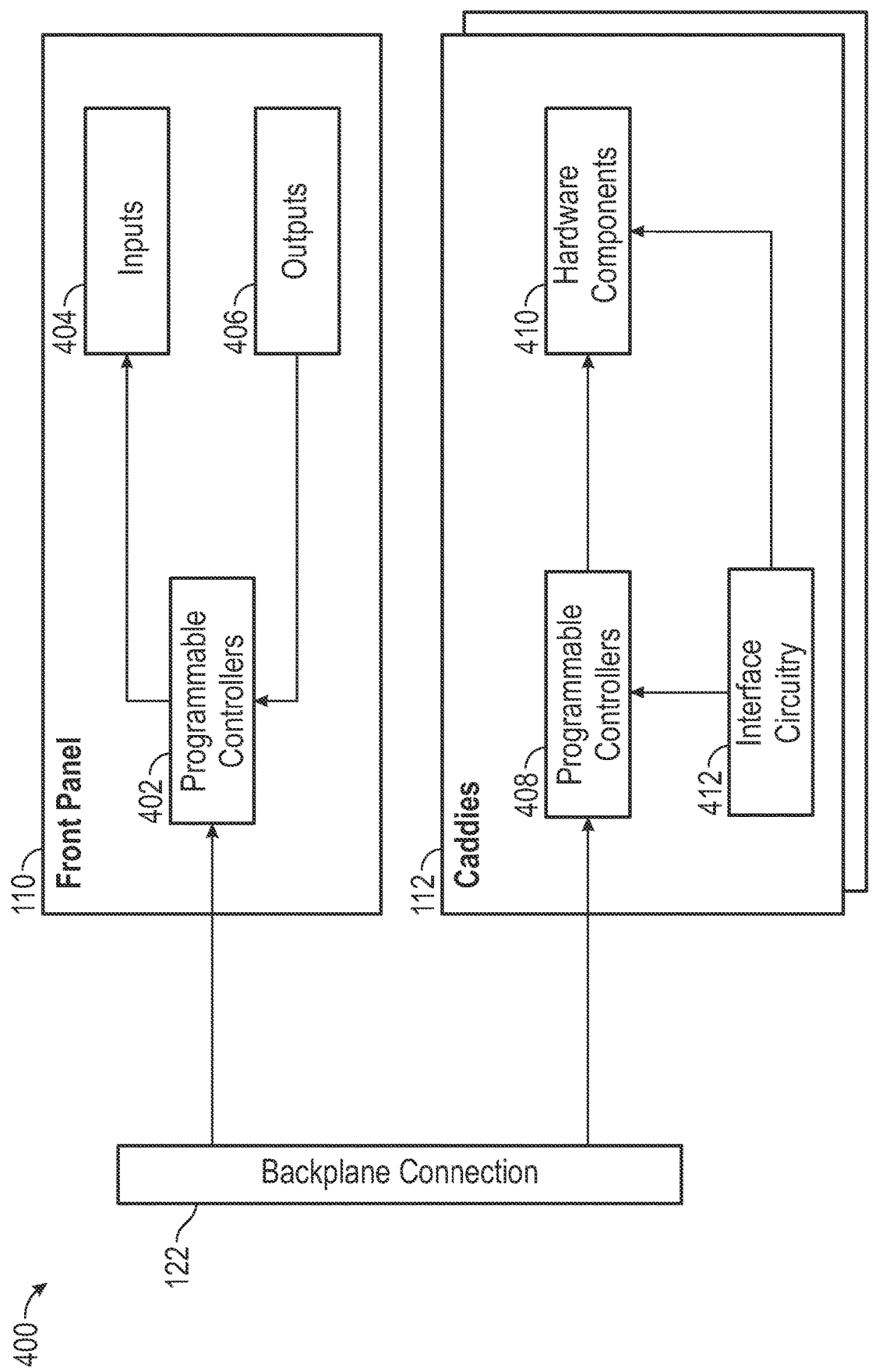
FIG. 4 is a more detailed illustration of the example BMC-based system, including a more detailed view of a front panel and caddies, according to embodiments of the present disclosure.

FIG. 4 is a more detailed illustration of the example BMC-based system, including a more detailed view of front panel 110 and caddies 112, according to embodiments of the present disclosure.

Front panel 110 may include programmable controllers 402, and inputs 404 and outputs 406 to users. Controllers 402 may be implemented by digital circuitry, analog circuitry, instructions for execution by a processor, or any suitable combination thereof. Controllers 402 may facilitate input and output by users through inputs 404 and outputs 406.

Caddies 112 may include programmable controllers 408, interface circuits 412, and hardware components 410. Controllers 408 and interface circuits 412 may be implemented by digital circuitry, analog circuitry, instructions for execution by a processor, or any suitable combination thereof.

Figure 5:
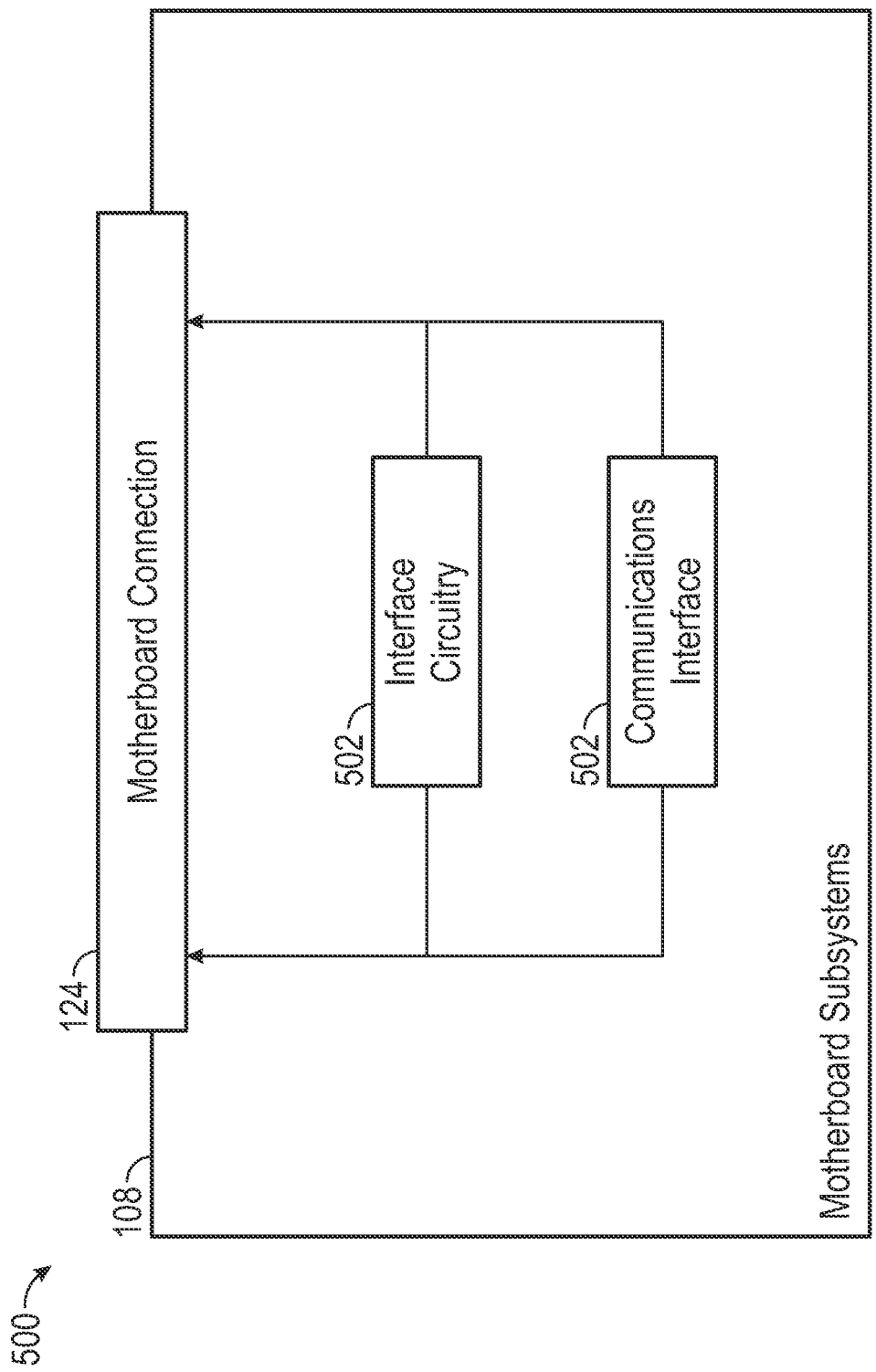
FIG. 5 is a more detailed illustration of the example BMC-based system, including a more detailed view of motherboard subsystems, according to embodiments of the present disclosure.

FIG. 5 is a more detailed illustration of the example BMC-based system, including a more detailed view of motherboard subsystems 108, according to embodiments of the present disclosure.

In operation, using PPC 312, 322, BMC 102 can selectively control the power of various elements of server 114. This can include removal of power from SoC 302 while leaving power to motherboard shared memory 304 and motherboard firmware and UEFI 306. BMC 102 can remove of power from front panel 110 to prevent any external inputs 236 or outputs 234. BMC 102 can remove power to caddie 112 to disable various hardware components 410 therein. BMC 102 can, for example, such as powering down hard drives. BMC 102 can remove power to motherboard subsystems 108 to power down communications interface 224. In addition to removing power to disable server functions, BMC 102 can also put individual components in standby modes when they are not needed. Control of power in this way may be performed using PSI 218.

PSI 218 may also be used to program components within server 114. For example, an Ethernet controller in external connections 132 may be controlled by BMC 102 through use of PSI 218. BMC 102 may provide programming to communications interfaces of external connections 132 to specify communications with particular external servers. In another example, programming information may be written into motherboard shared memory 304 by SoC 302, but read by BMC 102 using PSI 218. Data from a given motherboard shared memory 304 address may be intended for, for example, a particular motherboard subsystem 108, front panel 110, or a particular caddie 112, or components therein. BMC 102 may be configured to reprogram these server components and override SoC 302 programming by rewriting the data of shared memory 304.

One of the challenges with server architectures may be to obtain remote access when the server operational environment is not active or is functioning incorrectly. In other implementations, a BMC monitoring system may use the same power as the rest of the server components. Accordingly, if the power is removed from these components, such as a SoC, memory, or a communications interface, then no remote access of the server or BMC can be obtained. However, in embodiments of the present disclosure, BMC 102 may be self-contained from a functional perspective, and can also obtain power separately from Ethernet or USB connectors of external connections 132 interface directly.

As discussed above, a remote site 106, including a communications interface 118 and a management server 116, can communicate with BMC 102 via a secure OOB channel 128, such as a wireless network, non-production LAN, etc. BMC 102 may connect to secure OOB channel 128 via its Ethernet interface 222 or USB interface 220. In this manner, BMC 102 can communicate directly with remote site 106 without use of SoC 302 or other parts of server 114, other than external connections 132 communication pathways thereto. BMC 102 can be powered locally, or externally through OOB channel 128, such as with power over Ethernet (POE).

Because BMC 102 may be independent of the other server components 104, 108, 110, 112, it can perform several functions.

First, BMC 102 may be configured to update a universal driver library autonomously and on behalf of server 114 and independent of server 114 (other than the use of external connections 132 and the communication pathways thereto). BMC 102 may be configured to use programmable serial interface 120 to determine the inventory of hardware components within server 114. BMC 102 may contain a universal library of device drivers that provide support for all hardware available in the server configuration. When a server component is changed, BMC 102 can detect the new hardware configuration and install the required hardware driver from the universal library directly into motherboard firmware and UEFI 306. Using OOB channel 128, management server 116 can communicate with BMC 102 and maintain the universal library through updates. This can be accomplished even if the server is powered down in, for example, Advanced Configuration and Power Interface (ACPI) sleep states S4/S5. BMC 102 can individually isolate and power system memories such as motherboard shared memory 304 or motherboard firmware and UEFI 306. Drivers can then be loaded without powering any additional server components. The new drivers may be available when server 114 powers up and boots into normal operation.

Second, BMC 102 may be configured to access a non-responsive server, such as an instance of server 114. In certain circumstances, server 114 can enter a non-responsive state. This may be due to, for example, a malfunction within the hardware or software of server 114, or due to the action of malicious software. In such a state, server 114 might not be able to perform its normal operations, nor might communications be established through motherboard 104. A typical response to this condition may be to reboot server 114. However, valuable information can be lost when employing such a typical response. Using BMC 102, server 114 may be queried, including hardware and software in motherboard 104, motherboard subsystems 108, front panel 110, or caddie 112, using PSI 218 without the involvement of SoC 302. This may allow remote management server 116 to attempt a diagnosis and provide corrective measures. Remote management server 116 can then use BMC 102 to respond with any suitable corrective action. These can include, but is not limited to, the following operations. System software may be restored to a known, good state. Hardware, firmware, or software configurations may be verified. Specific server components may be powered down, such as components 104, 108, 110, or 112, including SoC 302 and associated motherboard operating system 308. These components can remain powered down, even after a subsequent reboot, to isolate a faulty component. BMC 102 may perform system diagnostics, at a granular level, with or without SoC 302 being powered on. BMC 102 may collect logging information directly from motherboard shared memory 304. BMC 102 may download corrective measures and store them in motherboard shared memory 304 to be used in the next boot cycle.

As discussed above, BMC 102 and SoC 302 share common memory elements including motherboard shared memory 304 and motherboard firmware and UEFI 306. Server 114 can store logging information in motherboard shared memory 304. Should server 114 become unresponsive, then BMC 102 can power down SoC 302 via PPC 312. BMC 102 can also use motherboard programmable devices 310 to isolate motherboard shared memory 304. Motherboard programmable devices 310 may be implemented by digital circuitry, analog circuitry, instructions for execution by a processor, or any suitable combination thereof. Motherboard programmable devices 310 may be include, for example, a multiplexer controllable by BMC 102 through PSI 218. The multiplexer may be configured to switch a memory interface for motherboard shared memory 304 to be alternately be used by BMC 102 or SoC 302.

BMC 102 can then query the logging information with SoC 302, motherboard operating system 308, motherboard firmware and UEFI 306 being completely disabled. The disablement can result from the server being powered down (intentionally or unintentionally), or from SoC 302 failing to correctly execute the motherboard operating system 308. In the latter case, SoC 302 might not respond to any external commands to provide corrective actions, such as reboot commands, and may be deemed non-operational. Using BMC 102 to power down SoC 302 may be useful if the non-operational state was a result of malicious software. In some cases, malicious software may perform unwanted actions during power down and a native reboot may compromise logging information.

Prior to any reboot operation, BMC 102 can perform server diagnostics. Because BMC 102 can use PPC 312, 322, only selected portions of server 114 might be powered. This allows BMC 102 to run diagnostics on the isolated elements. For example, BMC 102 may power a caddie 112 and test a hardware component 410 by providing power through caddie 112 and front panel serial interface 314. Results of the diagnostic procedure can be stored in RAM 204 of BMC 102. This may be performed while other components are powered down, and thus not capable of interfering with the diagnostics of the power-up element such as caddie 112.

Figure 6:
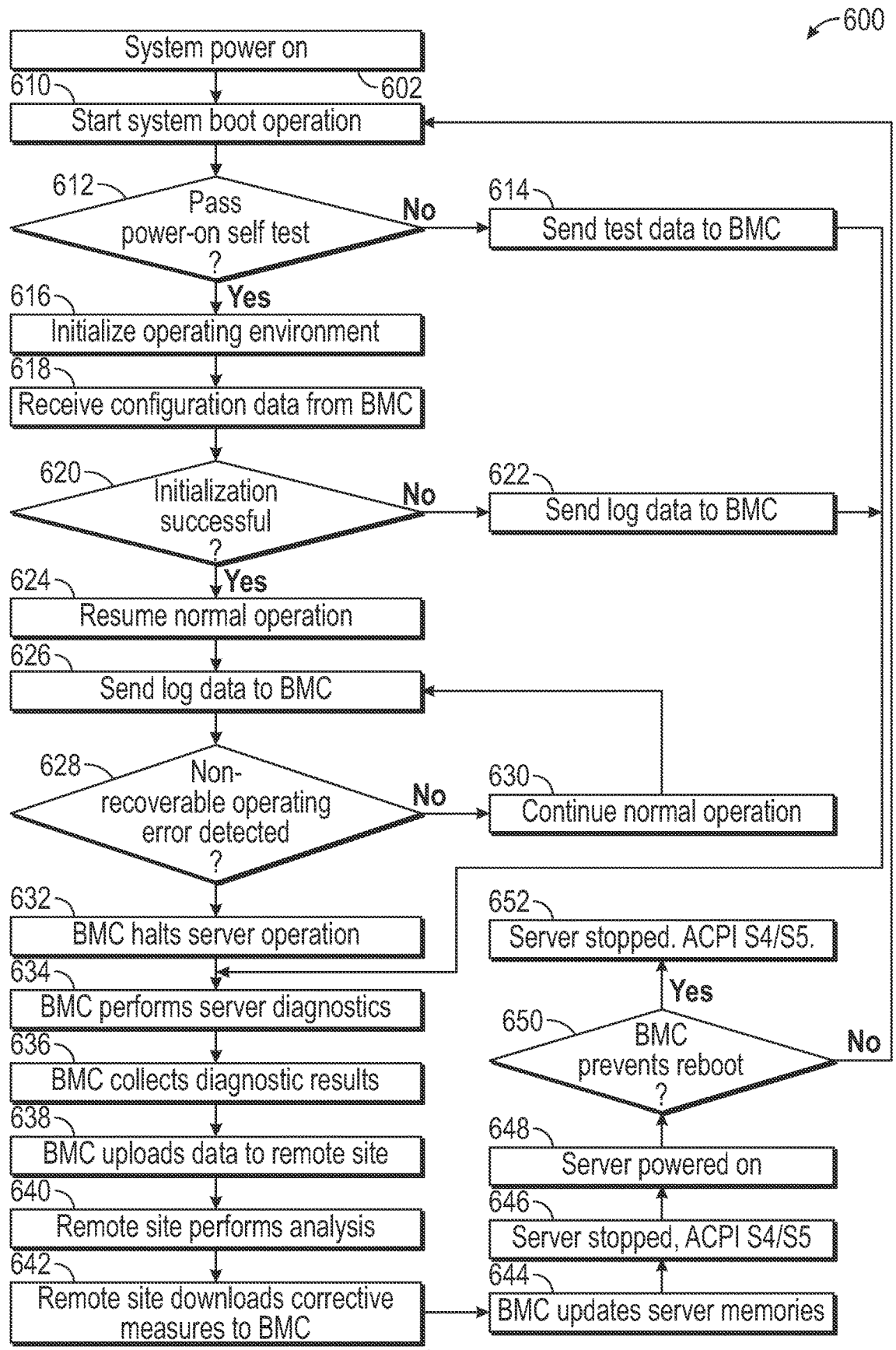
FIG. 6 is an illustration of an example method for non-responsive server recovery, according to embodiments of the present disclosure.

BMC 102 can connect to remote site 106. Using this connection, logging information from motherboard shared memory 304 and diagnostic information from RAM 204 can be uploaded. Management server 116 can analyze this information and download a set of corrective measures to BMC 102 via 00B channel 128. These may include changes to motherboard shared memory 304, motherboard firmware and UEFI 306, or motherboard operating system 308. These changes can be made prior to rebooting server 114 such that they take affect up on the next boot cycle FIG. 6 is an illustration of an example method 600 for performing access to a non-response server, according to embodiments of the present disclosure. Method 600 may be implemented in any suitable manner, such as by system 100 as shown in FIGS. 1-5. Method 600 may be performed by analog circuitry, digital circuitry, control logic, instructions for execution by a processor, or any suitable combination thereof. More specifically, method 600 may be implemented by BMC 102, processor 206, motherboard 104, or SoC 302. Method 600 may include more or fewer steps than shown in FIG. 6. The steps of method 600 may be optionally repeated, omitted, performed recursively, or performed in parallel, or in a suitable alternate order than shown in FIG. 6.

At 600, server 114 may be initially powered on. This may include turning on BMC 102 to program the correct power levels in PPC 312, 322 to power server components 104, 108, 110, 112.

At 610, in initial system boot operation, SoC 302 may execute the instructions in the motherboard firmware and UEFI 306. BMC 102 may have the capability to modify these instructions prior to boot time.

At 612, a power-on self-test (POST) 612 may be performed. As described earlier, the POST can be modified by BMC 102, via corrective measures, prior to the boot cycle starting. If the POST test passes, then method 600 may proceed to 616, Otherwise, method 600 may proceed to 614.

At 614, as the POST test has failed, BMC 102 can collect test data, such as log files, hardware component information using PSI 218. BMC 102 may store this information in motherboard shared memory 304. Method 600 may proceed to 634.

At 616, as the POST test has passed, the operating environment may be initialized using configuration data and corrective measures loaded at 618 provided by BMC 102 that was previously stored in motherboard firmware and UEFI 306 and motherboard shared memory 304 the using PSI 218.

At 620, it may be determined whether initialization was successful. If the system does not successfully initialize, method 600 may proceed to 622. If the system does successfully initialize, method 600 may proceed to 624.

At 622, log data may be collected by SoC 302 and stored in motherboard shared memory 304 for later collection by BMC 102. Method 600 may proceed to 634.

At 624, server 114 may continue normal operation. At 626, SoC 302 may send logging data to motherboard shared memory 304 for later collection by BMC 102.

At 628, remote servers 116, BMC 102, or server 114 itself may check for a non-responsive state. A non-responsive state may be determined by, for example, use of a watchdog timer. If normal operation is detected, method 600 may proceed to 630. Otherwise, if a non-responsive state is detected, method 600 may proceed to 632.

At 630, normal operation may be continued. Method 600 may proceed to 626.

At 632, BMC 102 may halt the server operation. This may include completely powering down SoC 302 using PPC 312.

At 634, BMC 102 may perform various server diagnostics as described earlier. At 636, BMC 102 may collect the diagnostic results into its RAM 204. At 638, BMC 102 may collect the logging data from motherboard shared memory 304 and diagnostic data from RAM 204. This data may then be secured using cryptographic functions provided by AES/RSA encryption module 212 since SoC 302 is powered down and not able to provide such functions. The secured data may be sent to management server 116 via OOB channel 128.

At 640, management server 116 may perform analysis on the data it has received from BMC 102 and may generate a set of corrective measures. These may be secured using cryptographic functions.

At 642, BMC 102 may download the secure corrective measures from management server 116 using OOB channel 128. Using cryptographic functions provided by AES/RSA encryption module 212, BMC 104 may extract the corrective measures from the downloaded data and store it in its RAM 204.

At 644, BMC 102 may update motherboard shared memory 304 and motherboard firmware and UEFI 306 from its RAM 204 using PSI 118 as required. These updates may be available for the next boot cycle as described earlier in step 618

At 646, BMC 102 may power down the server into, for example, ACPI state S4/S5. BMC 102 can still perform additional tests and update motherboard shared memory 304 and motherboard firmware and UEFI 306 while the system is in a S4/S5 state. All data collected by BMC 102 can be sent to remote management server 116 for diagnostic purposes.

At 648, server 114 may be powered back on from ACPI state S4/S5.

At 650, BMC 102 may perform any suitable corrective action provided in step 642. These actions may include preventing server 114 from rebooting. If BMC 102 prevents booting, method 600 may proceed to 652, wherein server 114 is powered down by, for example, returning server 114 to ACPI state S4/S5. If server 114 is allowed to continue reboot, then method 600 may return to restart the boot cycle at 610. If server 114 has been prevented from rebooting, then management server 116 may create a recorded event that may be used for notification.

Figure 7A:
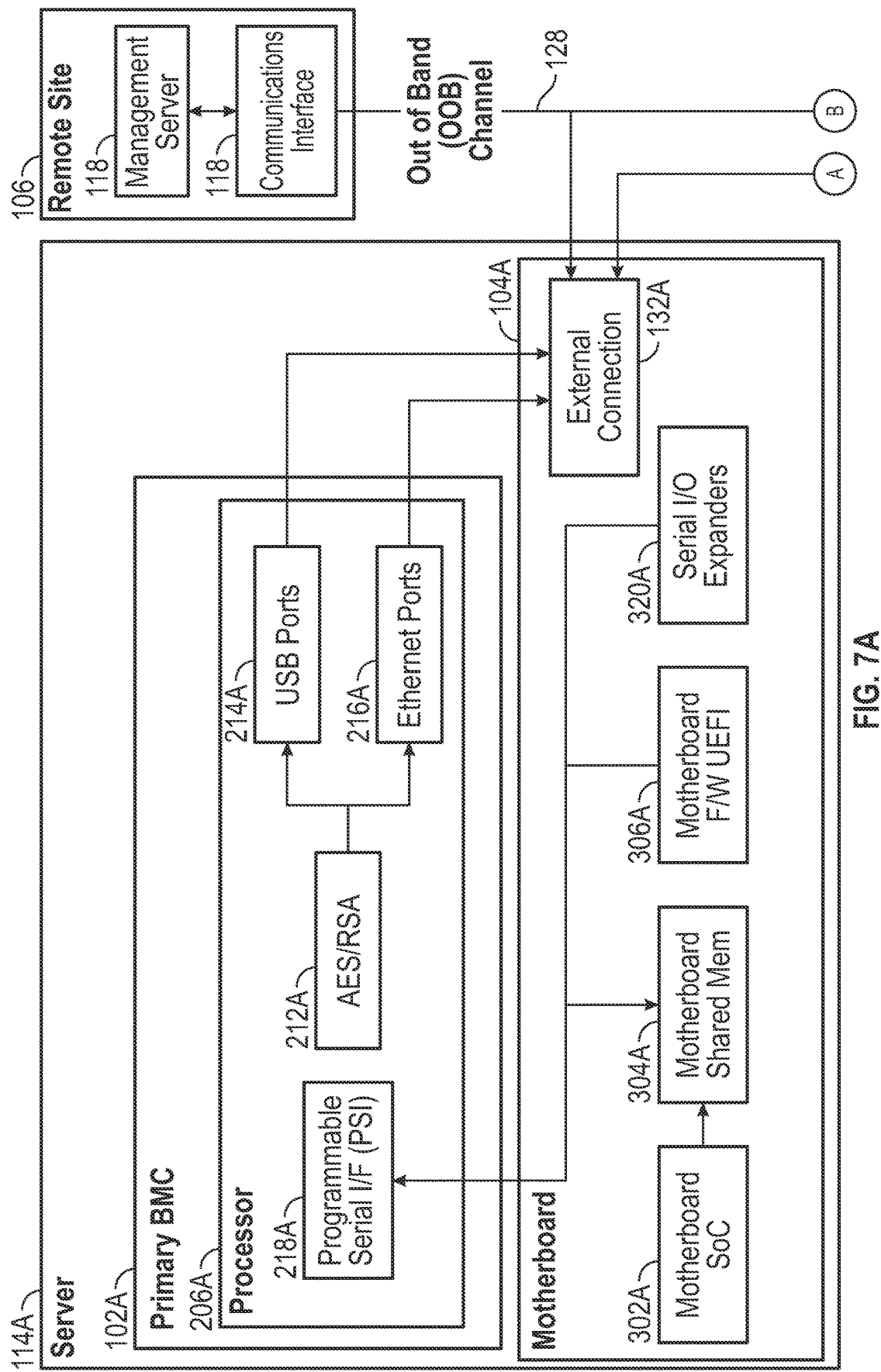
FIGS. 7A and 7B show the operation of two servers, according to embodiments of the present disclosure.
Figure 7B:
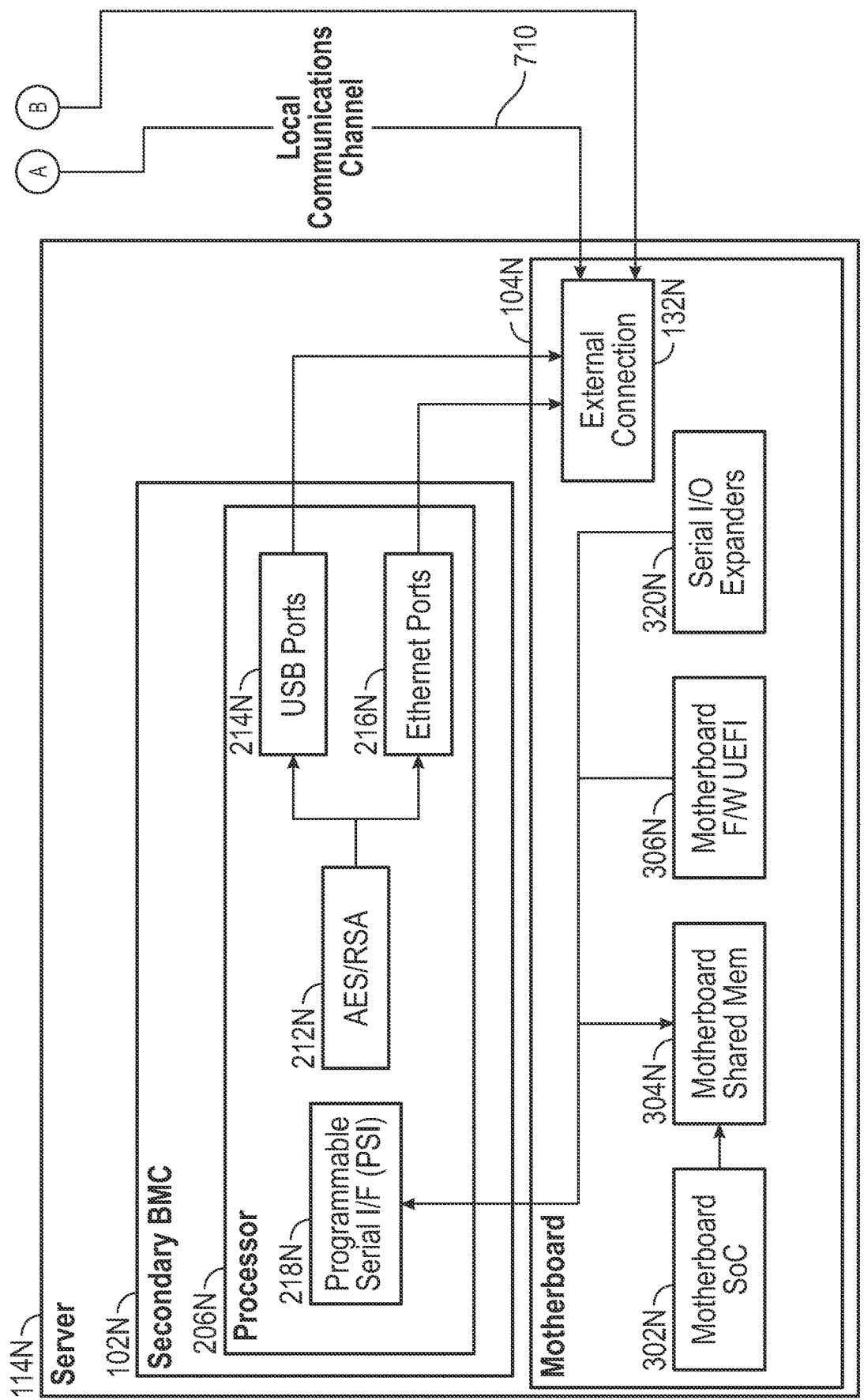

FIGS. 7A and 7B illustrate operations of two servers 114, according to embodiments of the present disclosure. Although two servers are illustrated, any suitable number and kind of servers 114 may be used. The BMC 102 of one of servers 114 may be designated as a primary BMC, while the remaining BMCs 102 may be designated as secondary BMCs. The primary BMC may perform various administration and monitoring tasks for the servers of the secondary BMCs. There may be, for example, N BMCs, wherein BMC 102A is the primary BMC and BMC 102N is illustrated as an example, single instance of the secondary BMCs. Various server components are omitted from illustration for clarity.

BMCs 102 may be connected to remote site 106. This connection may be made, as shown in FIGS. 1-5, by external connections 132A. The connection may result in OOB channel 128, as described in FIGS. 1-5. However, in one embodiment and as shown in FIG. 7, BMCs 102 may also be connected together through local communications channel 710. Local communications channel 710 may be implemented through connection through any suitable mechanism, such as digital circuitry, analog circuitry, or any suitable combination thereof, and using any suitable protocol. Local communications channel 710 may be implemented through connection to a same or different mechanism as OOB channel 128. For example, local communications channel 710 may be implemented through external connections 132A. In another example, local communications channel 710 may be implemented as a wired, wireless, Ethernet, or other suitable interface. In yet another example, local communications channel 710 may be implemented as a USB interface of BMC 102, such as interface 220. Local communications channel 710 may connect together primary and secondary BMCs 102.

The components of processor 206A, such as AES/RSA encryption module 212, embedded operating system 202, and RAM 204 (not shown) can provide secure communications services for local communications channel 710 and for OOB channel 128. This may allow management server 116 to securely communicate directly with BMC 102A. These communications may include corrective actions described earlier. The communications may be used to modify the operation of motherboard 104A. Processor 206A may transfer the substance of the communications to the UEFI and firmware 306A or I/O expanders 320A using PSI 218A. The updates to UEFI and firmware 306A, such as modified POST tests, may be used by SoC 302A for future operations. The information sent to I/O expanders 320A may be used to modify the operation of other server components as described earlier, such as powering down sever elements.

In some cases, such as where one of servers 112 is powered down or non-operational, communications may not be possible through external connections 132 of the powered-down or non-operational server 114 to remote site 106. In such cases, primary BMC 102A can communicate to secondary BMC 102N using local communications channel 710. This can be a wired or wireless connection. In this case, primary BMC 102A may relay the communications to secondary BMCs such as BMC 102N using local communications channel 710 connected to respective BMCs 102. If local communications channel 710 is a wireless network configuration, BMCs 102 may use a Received Signal Strength Indicator (RSSI) filtering operation to restrict a range of other BMCs 102 that can be used for the local area network. For example, only strong wireless signals may be accepted at BMC 102A from BMC 102N. This may increase the security of the local area network by physically limiting the connectivity range.

In the case of a powered down or non-responsive server, primary BMC 102A may utilize external connectors 132A or other mechanisms (such as USB interface 220) used to provide local communications channel 710 to connect in-band or out-of-band to the external connectors 132N or other mechanisms (such as USB interface 220) server 114N. This may allow primary BMC 102A to supply operating power to secondary BMC 102N. Secondary BMC 102N can then carry out functions as described above, such as the operations of method 600. Secondary BMC 102N may, for example, prevent other components of server 114N from rebooting after a malware attack. This may also allow information to be relayed from management server 116 to or from secondary BMC 102N.

Although example embodiments have been described above, other variations and embodiments may be made from this disclosure without departing from the spirit and scope of these embodiments.

We claim:

1. A system, comprising:
   a first server including a first baseboard management controller (BMC) and a first operating environment including a first motherboard and a first processor; and
   a second server including a second BMC and a second operating environment including a second motherboard and a second processor;
   wherein the first BMC includes circuitry configured to:
   determine that the second server is in a standby mode wherein the second operating environment is powered down and the second BMC is powered only through a connection between the BMCs;
   determine that additional resources for execution by the system from the second server are to be activated; and
   send a wake-up signal to the second BMC;
   wherein the second BMC includes circuitry configured to:
   receive the wake-up signal;
   wake the second operating environment; and
   provision the second operating environment.

2. The system of claim 1, further comprising:
   a third server including a third BMC and a third operating environment including a third motherboard and a third processor;
   wherein the first BMC includes circuitry further configured to:
   determine that the third server is in a normal mode wherein the third operating environment is powered up;
   determine that resources for execution by the system from the third server are to be deactivated; and
   send a signal to the third BMC to deprovision the determined resources to be deactivated.

3. The system of claim 1, wherein the first BMC includes circuitry further configured to wake the second operating environment through a power up sequence specific to the elements of the second operating environment.

4. The system of claim 1, wherein the first BMC includes circuitry further configured to:
locally store a superset of device drivers for the first BMC, the superset of device drivers including device drivers for hardware not present on the first BMC;
determine newly added hardware in the first BMC;
update the device drivers on the first BMC from the locally stored superset of device drivers for the first BMC to accommodate the newly added hardware.

5. The system of claim 1, wherein the first BMC is configured to update the second BMC when the second BMC is powered down in an ACPI sleep state of S4 or S5.

6. The system of claim 1, wherein the first BMC is configured to perform a hardware inventory of the second BMC when the second BMC is powered down in an ACPI sleep state of S4 or S5.

7. The system of claim 1, wherein the first BMC is configured to retrieve logging data from a memory of the second BMC when the second BMC is in a non-responsive state.

8. The system of claim 1, wherein the first BMC is configured to perform full remote operational testing and remediation of a server motherboard and associated subsystems of the second server without an operating system of a powered SoC of the second server.

9. The system of claim 1, wherein the first BMC is configured to preconfigure the second server when the second server is powered down.

10. The system of claim 1, wherein the first BMC is configured to:
determine an indication of malware or a security breach on the second server;
selectively power down or reconfigure one or more components of the second server based on the determination of malware or the security breach;
isolate firmware and UEFI from a system processor of the second server based on the determination of malware or the security breach; and
prevent system reboot of the second server after a non-operational state detection based on the determination of malware or the security breach.

11. The system of claim 1, wherein the first BMC is configured to power up the second BMC upon a determination that the second BMC may safely operate.

12. The system of claim 1, wherein the first BMC is configured to provide power to the second BMC through a USB or Ethernet interface.

13. The system of claim 1, wherein the first BMC is configured to:
determine a security attack on the second BMC;
reboot the second BMC; and
perform a corrective action upon the reboot of the second BMC in response to the security attack.

14. The system of claim 1, wherein the determination that the second server is in standby mode and additional resources from the second server are to be activated is to be provided by a remote server to the first BMC.

15. An apparatus comprising:
a first baseboard management controller (BMC);
a first operating environment including a first motherboard and a first processor; and
circuitry configured to:
determine that a server is in a standby mode, wherein:
the server includes a second BMC and a second operating environment including a second motherboard and a second processor;
the second operating environment is powered down and the second BMC is powered only through a connection between the BMCs;
determine that additional resources for execution by the system from the server are to be activated; and
send a wake-up signal to the second BMC to cause circuitry of the second BMC to:
receive the wake-up signal;
wake the second operating environment; and
provision the second operating environment.

16. The apparatus of claim 15, wherein the circuitry is further configured to:
determine that a third server is in a normal mode, the third server including a third BMC and a third operating environment including a third motherboard and a third processor, wherein the third operating environment is powered up;
determine that resources for execution by the system from the third server are to be deactivated; and
send a signal to the third BMC to deprovision the determined resources to be deactivated.

17. The apparatus of claim 15, wherein the circuitry is further configured to wake the second operating environment through a power up sequence specific to the elements of the second operating environment.

18. The apparatus of claim 15, wherein the circuitry is further configured to:
locally store a superset of device drivers for the first BMC, the superset of device drivers including device drivers for hardware not present on the first BMC;
determine newly added hardware in the first BMC;
update the device drivers on the first BMC from the locally stored superset of device drivers for the first BMC to accommodate the newly added hardware.

19. The apparatus of claim 15, wherein the circuitry is further configured to update the second BMC when the second BMC is powered down in an ACPI sleep state of S4 or S5.

20. The apparatus of claim 15, wherein the circuitry is further configured to perform a hardware inventory of the second BMC when the second BMC is powered down in an ACPI sleep state of S4 or S5.

21. The apparatus of claim 15, wherein the circuitry is further configured to retrieve logging data from a memory of the second BMC when the second BMC is in a non-responsive state.

22. The apparatus of claim 15, wherein the circuitry is further configured to perform full remote operational testing and remediation of a server motherboard and associated subsystems of the second server without an operating system of a powered SoC of the second server.

23. The apparatus of claim 15, wherein the circuitry is further configured to preconfigure the second server when the second server is powered down.

24. The apparatus of claim 15, wherein the circuitry is further configured to:
determine an indication of malware or a security breach on the second server;
selectively power down or reconfigure one or more components of the second server based on the determination of malware or the security breach;
isolate firmware and UEFI from a system processor of the second server based on the determination of malware or the security breach; and
prevent system reboot of the second server after a non-operational state detection based on the determination of malware or the security breach.

25. The apparatus of claim 15, wherein the circuitry is further configured to power up the second BMC upon a determination that the second BMC may safely operate.

26. The apparatus of claim 15, wherein the circuitry is further configured to provide power to the second BMC through a USB or Ethernet interface.

27. The apparatus of claim 15, wherein the circuitry is further configured to:
   determine a security attack on the second BMC;
   reboot the second BMC; and
   perform a corrective action upon the reboot of the second BMC in response to the security attack.

28. The apparatus of claim 15, wherein the determination that the second server is in standby mode and additional resources from the second server are to be activated is to be provided by a remote server to the first BMC.

* * * * *